United States Patent [19]

Okayama et al.

[11] Patent Number: 5,133,028
[45] Date of Patent: Jul. 21, 1992

[54] OPTICAL WAVE-LENGTH FILTER AND A DRIVING METHOD THEREOF

[75] Inventors: Hideaki Okayama; Hiroki Yaegashi; Toshimasa Ishida, all of Tokyo, Japan

[73] Assignee: Oki Electric Industry Co., Ltd., Tokyo, Japan

[21] Appl. No.: 752,080

[22] Filed: Aug. 29, 1991

[30] Foreign Application Priority Data

Aug. 30, 1990 [JP] Japan .................................. 2-228858

[51] Int. Cl.$^5$ ............................ G02B 6/10; G02B 6/12
[52] U.S. Cl. ......................................... 385/11; 385/14; 385/28; 359/484
[58] Field of Search ............. 350/96.11, 96.12, 96.13, 350/96.14, 96.15, 96.30, 311; 385/11, 14, 8, 9, 2, 129, 130, 27, 28; 359/122, 301, 483, 484

[56] References Cited

U.S. PATENT DOCUMENTS

| | | | |
|---|---|---|---|
| 4,359,260 | 11/1982 | Reinhart et al. | 385/11 |
| 4,533,207 | 8/1985 | Alferness | 385/11 |
| 4,898,441 | 2/1990 | Shimizu | 385/11 |
| 4,966,431 | 10/1990 | Heismann | 385/11 |
| 5,002,349 | 3/1991 | Cheung et al. | 350/96.13 |

OTHER PUBLICATIONS

Tamir (Ed.) *Guided-Wave Optoelectronics* (Springer-Verlag, 1988) pp. 192–197.

Primary Examiner—Brian Healy
Attorney, Agent, or Firm—Edward D. Manzo

[57] ABSTRACT

There is provided an optical wave-length filter which is constituted by a wave-guide route formed on a surface of a substrate; a front stage polarizer disposed in the wave-guide route for transmitting as an input light either TM mode light or TE mode light; a plurality of mode-converters disposed in the wave-guide route for mode converting one TM/TE-mode light transmitted from the front stage polarizer having a conversion wave length corresponding to an output light of the optical wave-length filter into the other TE/TM-mode light; and a rear stage polarizer disposed in the wave-guide route for transmitting as the output light of the optical wave-length filter the other TE/TM-mode light; the mode-converters being constituted by a finger-type electrode for control and a finger-type electrode for earthing interdigitally coupled for each other and disposed along the wave-guide route.

12 Claims, 15 Drawing Sheets

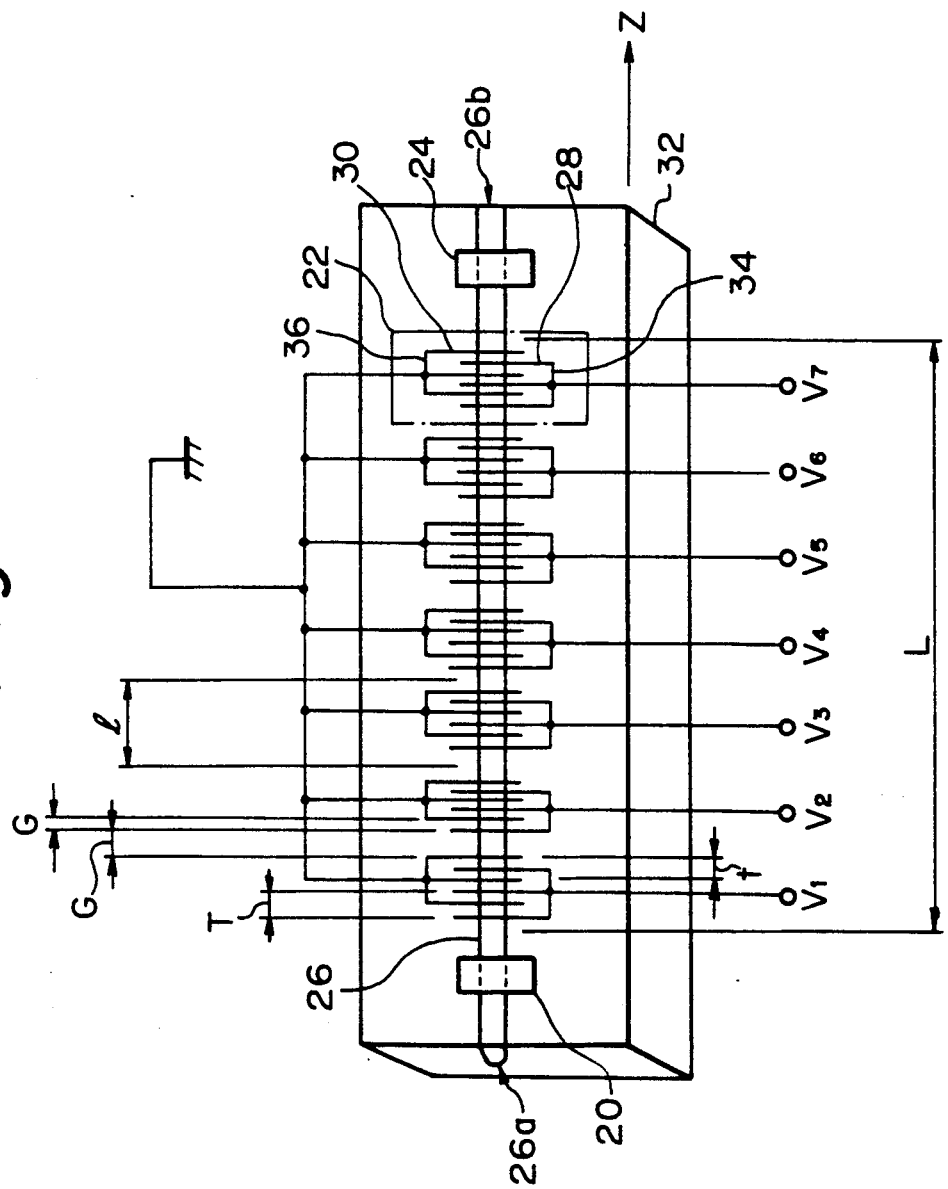

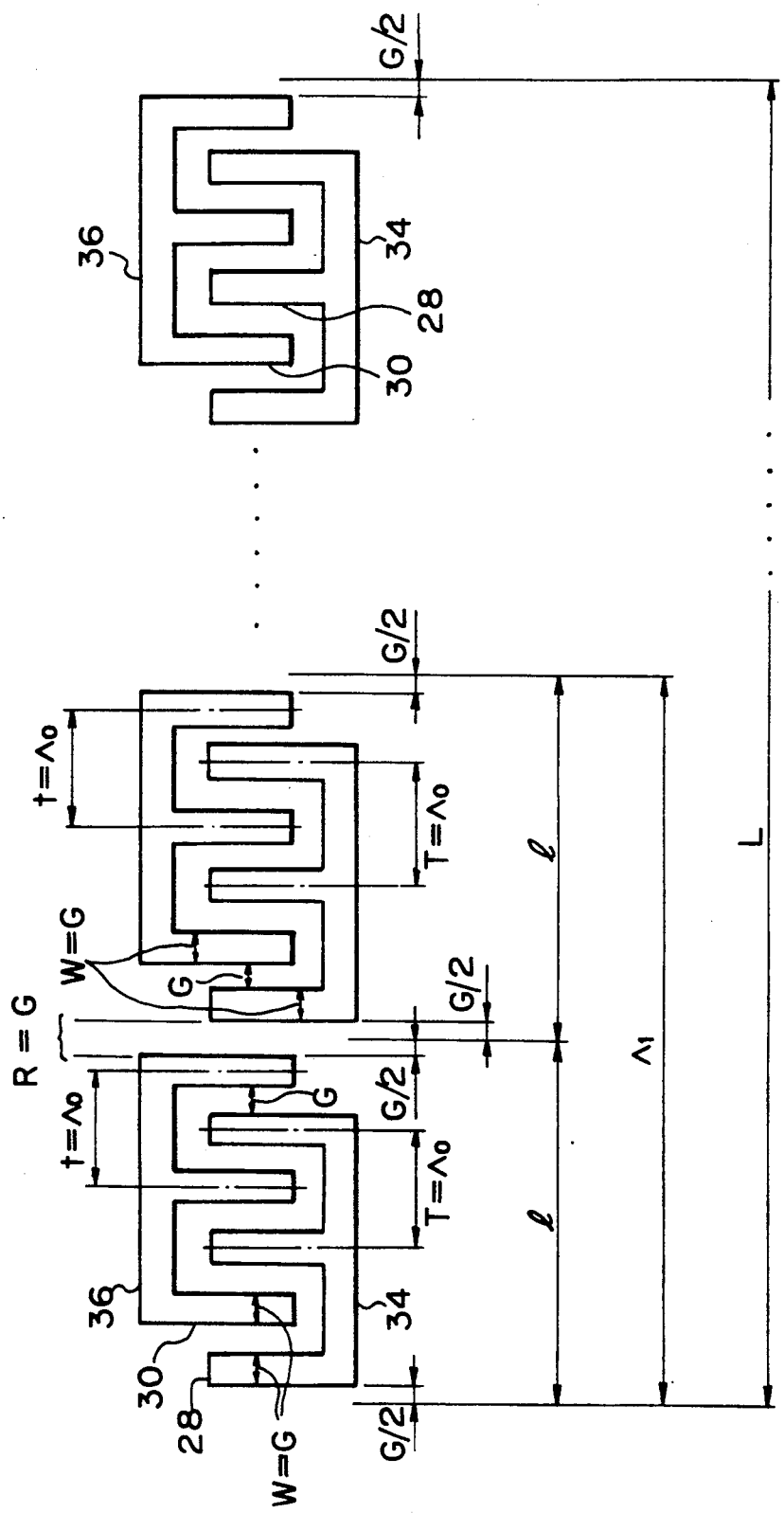

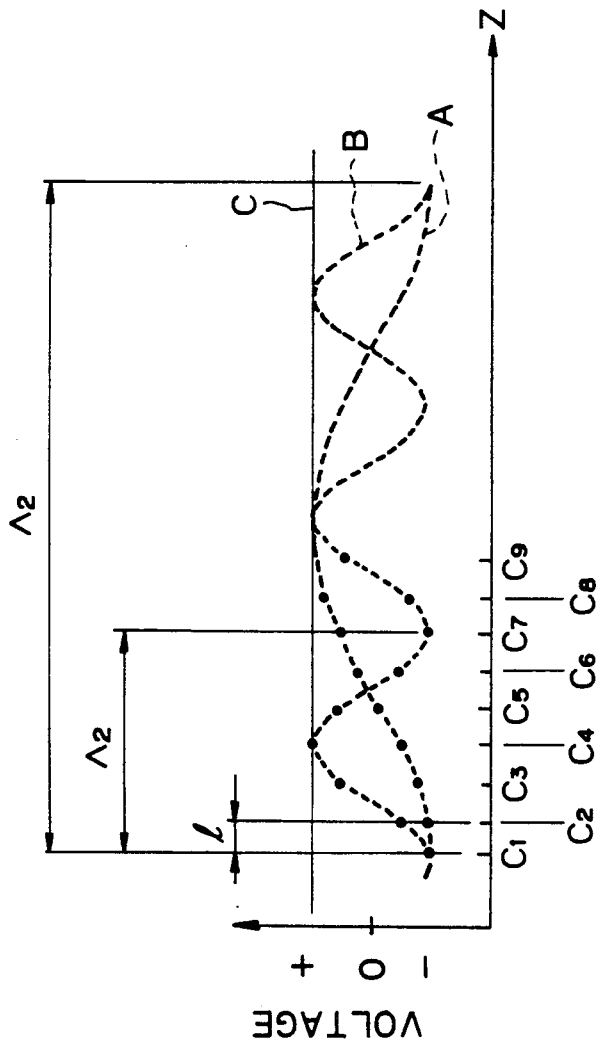

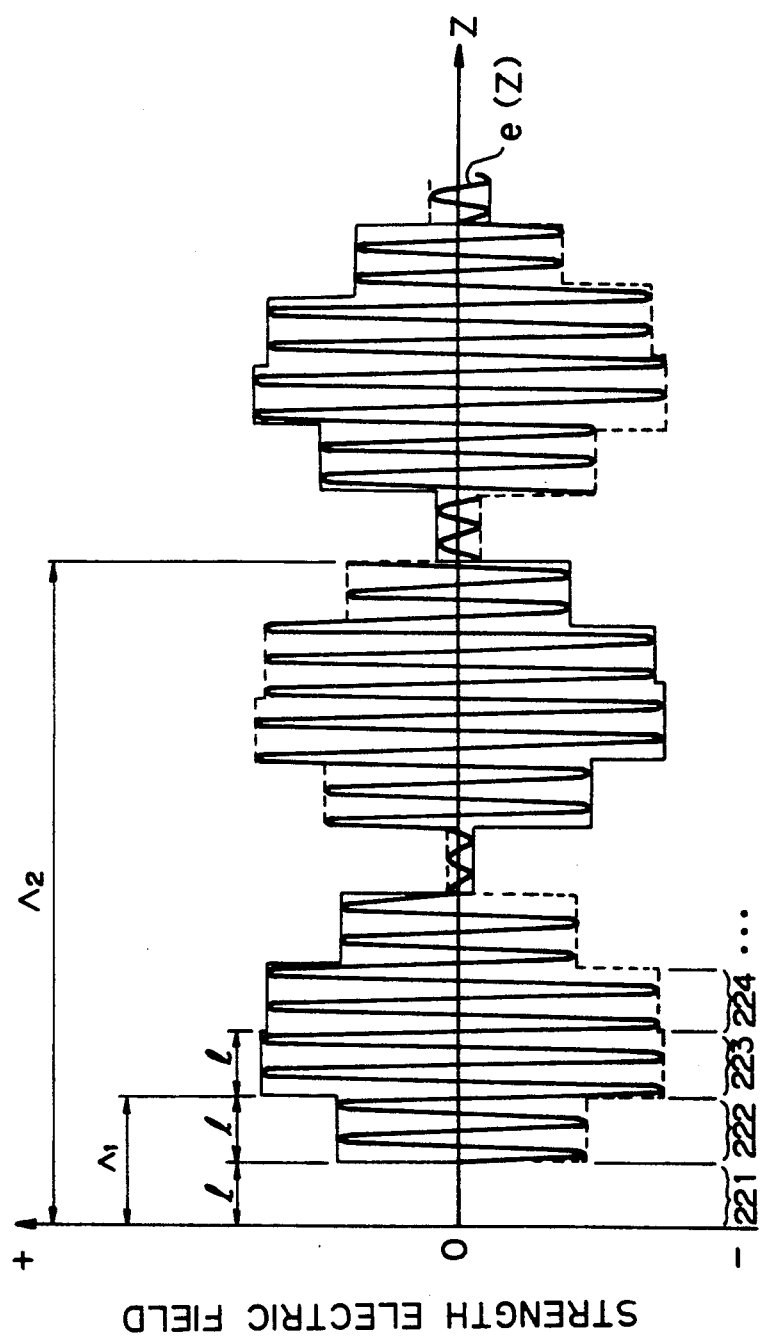

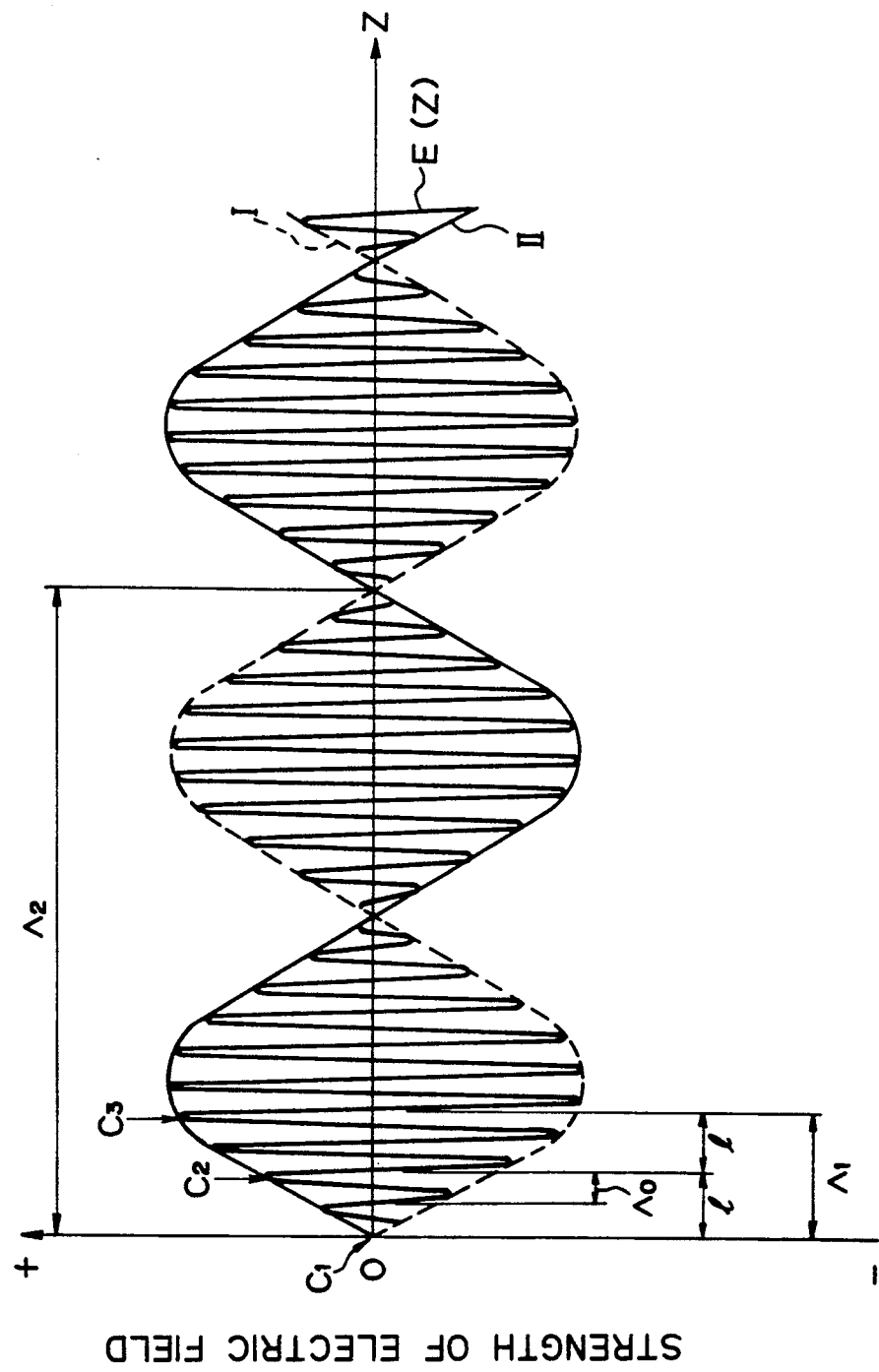

OPTICAL WAVE-LENGTH FILTER AND A DRIVING METHOD THEREOF

BACKGROUND OF THE INVENTION

The present invention relates to an optical wave-length filter and a driving method thereof.

An optical wave-length filter which can vary and adjust a wave length of transmitted light has been proposed in recent years.

This kind of conventional type filters is, for example, disclosed in Literature I entitled: "Guided-Wave Optoelectronics, p. 193~197, by Springer-Verlag Co. Ltd., 1988", which is constituted by a single mode-converter which can vary a transmitted wave-length, that is, a predetermined standard wave-length $\lambda_O$, within a range of adjustable deviation wave-length $\Delta\lambda_T$.

In this filter, the adjustable deviation wave-length $\Delta\lambda_T$ can be described as $\Delta\lambda_T = \Lambda \cdot \Delta Ne$, where $\Lambda$ is a period of comb-type electrodes and $\Delta Ne$ is a refractive index deviation of a wave-guide route in case the refractive index of the wave-guide route of the optical wave-length filter being electrically varied.

The conventional optical wave-length filter disclosed above has, however, a shortcoming that the maximum value ($=\Delta\lambda_T$ (max)) of the adjustable deviation wave-length $\Delta\lambda_T$ is so small that the adjustable range of the transmitted wave-length of the optical wave-length filter is restricted to be narrow.

In this filter, assuming that the standard wave-length $\lambda_O$ is 1.3 μm and Ti diffused wave-guide route is formed in LiNbO$_3$ substrate, $\Lambda$ will be approximately 18 μm and $\Delta Ne$ in a range of $10^{-3}$ so that an upper limit of $\Delta\lambda_T$(max) will be approximately 20 μm.

Since $\Delta\lambda_T$ (max)≈20 μm does not comply with a practically sufficient variable range of the transmitted wave-length, another alternative structure illustrated in FIG. 1 has been proposed to expand the adjustable range of the transmitted wave-length.

FIG. 1 is a perspective view illustrating one example of a multi-stage conventional optical wave-length filter.

The optical wave-length filter illustrated in the drawing is constructed such that a wave-guide route 12 is formed in a substrate 10, that polarizers 14 and 16 are respectively disposed at both sides of an input port 12a and an output port 12b of the wave-guide route 12, and that three (3) conventional filters (hereinafter called as mode-converter) 18 are, for example, disposed between these polarizers.

In this filter, a wave-guide type polarizer 14 permits to transmit TE mode light therethrough, a wave-guide type polarizer 16 permits to transmit TM mode light, and a mode-converter 18 converts the TE mode light having a predetermined transmitted wave length into the TM mode light.

As the result, light having a predetermined transmitted wave-length can be selected separately among lights have a plurality of different wave lengths.

This optical wave-length filter is designed such that the predetermined standard wave length $\lambda_O$ of the transmitted wave-length of each mode-converter 18 is set, departing each other, with an approximately $\Delta\lambda_T$(max) distance.

The mode-converter 18 is constituted by a pair of comb-type electrodes interdigitally coupled each other and finger-type electrodes 18a of the comb-type electrodes are disposed a certain distance from each other along wave-guide route 12.

Since the period of disposed position of electrodes 18a of the comb-type electrode is set to differ each other in each mode-converter 18, the standard wave-length $\lambda_O$ of the transmitted wave-length also differs from each other in each mode-converter 18.

When the voltage V1 is applied in a similar manner as in a conventional filter to the comb-type electrodes of the mode-converter 18, each of which is corresponding to the predetermined transmitted wave-length, optical mode conversion can be performed with a predetermined transmitted wave-length.

The band width $\Delta\lambda_W$ of the transmitted wave-length can be described as;

$$\Delta\lambda_W/\lambda = \Lambda/L,$$

wherein $\lambda$ is a wave length transmitted through the optical wave-length filter, and L is a distance (length of mode-converter) between the first finger-type electrode 18a and the last finger-type electrode 18a of mode-converter 18.

Accordingly, in order to shorten the band width $\Delta\lambda_W$ for improving filter characteristics, the length L of the mode-converter is needed to be large.

The conventional filter, however, necessitates n unit mode-converter 18 being coupled in series to select light having a predetermined wave-length among different lights having n wave-lengths, each of which exists departing each other in distance of $\Delta\lambda_T$ (max).

As the result, there is a shortcoming that the total length of the optical wave-length filter requires, at least, length of nL.

SUMMARY OF THE INVENTION

It is an object of the present invention to provide an optical wave-length filter and a driving method thereof which can expand adjustable transmitted wave-length of the filter.

It is another object of the present invention to provide an optical wave-length filter and a driving method thereof which can expand the adjustable transmitted wave-length of the filter without enlarging the total length of the filter.

To accomplish the above objects, there is provided an optical wave-length filter which is constituted by a wave-guide route formed on a surface of a substrate; a front stage polarizer disposed in the wave-guide route for transmitting as an input light either TM mode light or TE mode light; a plurality of mode-converters disposed in the wave-guide route for mode converting one TM/TE-mode light transmitted from the front stage polarizer having a conversion wave length corresponding to an output light of the optical wave-length filter into the other TE/TM-mode light; the mode-converters being constituted by a finger-type electrode for control and a finger-type electrode for earthing interdigitally coupled for each other and disposed along the wave-guide route; and a rear stage polarizer disposed in the wave-guide route for transmitting as the output light of the optical wave-length filter the other TE/TM-mode light.

There is also provided a method for driving an optical wave-length filter in which a voltage applied to each of the finger-type electrodes for control is controlled such that a distribution of electric field along the wave-guide route has a pseudo sine-wave form relative to corresponding disposed positions of the electrodes.

According to the above mentioned invention, the front stage polarizer can transmit one mode light selected among TM mode light and TE mode light but not transmit the other mode light.

To the contrary, the rear stage polarizer can transmit the other mode light but not transmit one mode light.

Since the mode-converter converts a light having a conversion wave-length corresponding to the output light of the optical wave-length filter among one mode light from the front stage polarizer, the rear stage polarizer can output one mode light having a predetermined conversion wave-length as the output light.

The mode-converter is constituted by finger-type electrodes for control and finger-type electrodes for earthing, each being disposed interdigitally coupled along the wave guide route.

These finger-type electrodes generates electric field to convert one mode light into the other mode light having a predetermined conversion wave-length.

The periods of the finger-type electrodes both for control and earthing can be preferably designed to be equal each other and all of the finger-type electrodes for control and earthing disposed between the front and the rear stage polarizers can be arranged with an equal interval.

BRIEF DESCRIPTION OF THE DRAWINGS

In the accompanying drawings, there are shown illustrative embodiments of the invention from which these and other of its objectives, novel features, and advantages will be readily apparent in which:

FIG. 2 (A), (B) are explanatory views illustrating the first embodiment of the first invention;

FIG. 3 (A), (B) are explanatory views illustrating an embodiment of the second invention;

FIG. 4 is a wave form chart illustrating smoothly alternating electric field distribution;

DETAILED DESCRIPTION OF PREFERRED EMBODIMENTS

Figure 1:
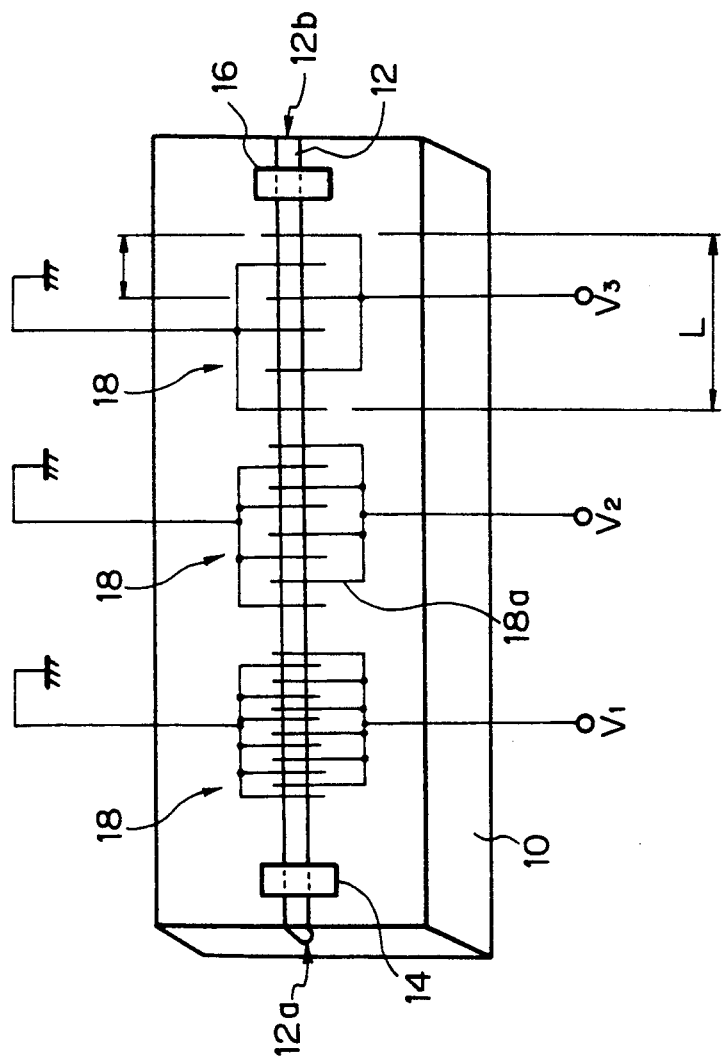
FIG. 1 is a perspective view illustrating one example of a conventional multi-stage optical wave-length filter.

Referring to the drawings, embodiments of the first and the second inventions will be hereinafter firstly explained in details in which the drawings are shown schematically to an extent that these inventions can readily be understood.

FIG. 2 (A), (B) is an explanatory view illustrating the first embodiment of the first invention. FIG. 2 (A) is a perspective view schematically illustrating the overall construction of the first embodiment of the first invention. FIG. 2 (B) is an enlarged plan view mainly illustrating the arrangement of finger-type electrodes for both control and earthing.

In this embodiment, one light will be corresponded to TM light and the other light to TE light for ease of explanation.

An optical wave-length filter according to the embodiment, as shown in FIG. 2 (A), employs a front stage polarizer 20 for transmitting TM light as input light of the optical wave-length filter, a plurality of mode-converters 22 for converting the mode of TM light having a corresponding conversion wave length to the output light of the optical wave-length filter among the TM light from the front stage polarizer 20 into TE light, a rear stage polarizer 24 for transmitting the TE light from the mode-converter 22 as output light of the optical wave-length filter, which are formed in a wave-guide route 26.

The mode-converter 22 is constituted by a finger-type electrode 28 for control and a finger-type electrode 30 for earthing, each electrodes being interdigitally coupled and disposed along the wave-guide route 26.

In this embodiment, the wave-guide route 26 in a form of straight line is formed by diffusing Ti in a X-cut LiNbO$_3$ substrate 32.

The front stage polarizer 20 is disposed at the input port 26a of the wave-guide route 26 and the rear stage polarizer 24 is disposed at the output port 26b; these polarizers 20 and 24 being wave-guide type.

Each mode-converter 22 includes a plurality of finger-type electrodes 28 for control and a like plurality of finger-type electrodes 30 for earthing (grounding).

Several such mode converters 22 are disposed between the front stage polarizer 20 and the rear stage polarizer 24. Each of the plurality of finger-type electrodes 28 employed in a unit of the mode-converter 22 is disposed in the wave-guide route 26. Electrodes 28 extend in a direction crossing the wave-guide route 26, as represented in the Figures.

These electrodes 28 within each mode converter 22 are connected to each other via a respective common electrode 34 situated outside of the wave-guide route 26, whereby a one comb-type electrode is formed as the commonly connected finger-type electrodes 28 for control.

In the same way, each of the plurality of finger-type electrodes 30 for earthing employed in a unit of the mode-converter 22 is disposed in the wave-guide route 26 and respectively extended in a direction crossing the wave-guide route 26.

Electrodes 30 of each converter 22 are connected to each other via respective electrode 36 situated outside of the wave-guide route 26, whereby the other comb-type electrode is formed as the commonly connected finger-type electrodes 30 for earthing.

These one and the other comb-type electrodes are disposed such that electrodes 28 and 30 are interdigitally coupled (interleaved).

In this embodiment, as shown in FIGS. 2 (A) and 2 (B), a period T of the electrode 28 and a period t of the electrode 30 are equal to a period $\Lambda_O (T = t = \Lambda_O)$ which is common with respect to all of the mode-converters 22.

All of the electrodes 28 and 30 disposed between the front and the rear stage polarizers 20 and 24 are disposed with an equal interval. This disposing interval (hereinafter often called an electrode gap) is represented in the drawings and herein by a letter G.

The unit length of each mode converter 22 is equal to l. The length l is defined as a distance between a position offset G/2 in a direction toward the front stage polarizer 20 from the starting electrode of the mode-converter 22 and a position offset G/2 in a direction toward the rear stage polarizer 24 from the ending electrode of the mode-converter 22. That is to say, with reference to FIG. 2(B), the unit length l begins G/2 to the left of the left-most electrode 28 and ends G/2 to the right of the right-most electrode 30 of each converter 22. It will be appreciated then that the distance separating any corresponding edges of corresponding fingers 28 or 30 of adjacent converters 22 is equal to the unit length l in FIG. 2(B).

The letter L, shown in FIGS. 2 (A) and 2 (B), represents a total length of the mode-conversion portion of an optical wave-length filter.

Accordingly, assuming that the total number mode-converters 22 disposed between the front and the rear stage polarizers 20 and 24 is r, then the total length L is described as $L = r \cdot l$.

The total length L corresponds to the length L of a single mode-converter 18 employed in the prior art optical wave-length filter shown in FIG. 1.

The symbol $\Lambda_l$, shown in FIG. 2 (B), which represents a period of disposing position of the mode-converter 22, is described as $\Lambda_1 = 2l$.

The letter W represents a width of an electrode and in this embodiment each of the widths of the finger-type electrodes 28 and 30 is set to be equal as a common width W. It is preferable to set the common width W being also equal to the electrode gap G (W=G).

Each of parameters set forth above, T, t, G, l, L, $\Lambda_1$ and W is defined as a calculated distance along the wave-guide route.

A method of driving the FIG. 2 (A), (B) embodiment will now be described. This method controls the voltage of each finger-type electrodes 28 such that distribution of the electric field along the wave-guide route 26 which is generated with the finger-type electrodes 28 and 30 has a pseudo sine-wave form accompanying a beat.

It also controls the distribution of the electric field to be preserved as a fixed form corresponding to the conversion wave-length with which the mode-conversion is proceeded.

The voltage applied to each of the finger-type electrodes 28 of mode-conversion is controlled such that the distribution of the voltage has a psuedo sine-wave form corresponding to the disposed position of the electrodes 28.

FIG. 3 is an explanatory view of the embodiment according to the method invention.

Now, referring to FIG. 2, (A), (B) the embodiment will be explained further in details. The FIG. 2 embodiment disposes a plurality of mode-converters 22 each employing a plurality of the finger-type electrodes 28 for control.

Accordingly, to simplify the voltage control of these finger-type electrodes 28, the same voltage Vm is applied to every finger-type electrode 28 belonging to the same unit mode-converter 22, wherein the voltage applied to the finger-type electrode 28 belonging to the m-th mode-converter 22 counted sequentially along the wave-guide route 26 is represented with letter Vm (m=1, 2, ...).

FIG. 3 (A) shows a distribution of the voltage Vm, in which the vertical axis represents voltage V and the horizontal axis represents a position z in a direction along the wave-guide route 26.

In the drawing, the letter Cm, representing a position where the m-th mode-converter 22 is located along the wave-guide 26, can be shown either as a starting, an ending or a center position.

An appropriate position C1 is chosen on the z-axis and positions C2, C3, ... are sequentially set from the position C1 with an interval l.

The voltage Vm applied to the finger-type electrode 28 for control which belongs to the mode-converter 22 (the m-th mode-converter 22) located at the position Cm is plotted as a black circle in the drawing.

The voltage Vm is set, in case of driving the optical wave-length filter, such that the distribution of the voltage Vm has a pseudo sine-wave form as illustrated as black circles on the curve A or B in FIG. 3 (A).

For setting the voltage, a psuedo sine-wave curve, such as the curve A or B, is imaged in a V-z plane as shown in FIG. 3 (A).

Although the wave form of the imaged pseudo sine-wave curve is preferably set as an accurate sine-wave curve like the curve A or the curve B, it is not limited thereto and it can be set as a similar wave form as the sine-wave form.

The curves A and B are, for example, represented as $V = \mathrm{Sin}\, z$ and the period of the curves A and B equals to a period $\Lambda_2$ described later (refer to FIG. 3 (B)).

The voltage ($= \mathrm{Sin}\, Cm$) corrsponding to the position Cm is, for example, represented as the voltage Vm.

Since the curve A or the curve B has a psuedo sine-wave form, the distribution of the voltage Vm has a psuedo sine-wave form varying step-wise when the voltage Vm is corresponded to the disposed location of the finger-type electrodes 28.

It is also possible to apply an equal voltage (V1=V2=... =const.) to the finger-type electrodes 28 of all the mode-converters 22 as shown as the line C in FIG. 3 (A), wherein the line C can be considered as a sine-wave having an indefinite (infinite) period.

The curve A represents a distribution of the voltage Vm in case of $\Lambda_1 < \Lambda_2 < \infty$, whereas the curve B represents in case of $\Lambda_2 = \Lambda_1$.

By way of the voltage Vm being applied to the finger-type electrodes 28 for control of the m-th mode-converter 22 and the finger-type electrodes 30 for earthing of all the mode-converters 22 being grounded to preserve the same potential, a psuedo sine-wave distribution of electric field e(z) can be achieved in a direction along the wave-guide route 26.

The distribution of electric field e(z) achieved above is shown in FIG. 3 (B).

In FIG. 2 (B), the vertical axis represents strength of electric field generated in the wave-guide route 26 in a direction of the thickness of a substrate and the horizontal axis represents the distance z along the wave-guide route 26.

As shown in FIG. 3 (B), the distribution of electric field e(z) according to the embodiment of the second invention has a psuedo sine-wave form accompanying a beat and varies step-wise.

Now, the embodiment is analyzed with coupling equations.

Although the distribution of electric field e(z) varies step-wise as described above, the distribution of electric field e(z) can be analogously considered to be a smoothly varying distribution of electric field $E(z)$ when the length $l$ of the mode-coverter 22 is extremely small.

Accordingly, an approximate analysis is proceeded hereinafter with the smoothly varying distribution of electric field $E(z)$.

FIG. 4 shows the smoothly varying distribution of electric field $E(z)$ and envelopes I and II thereof, in which the vertical axis represents strength of electric field in the wave-guide route 26 in a direction of the thickness of a substrate and the horizontal axis represents the distance $z$ along the wave-guide route 26.

The smoothly varying distribution of electric field $E(z)$ is described in general as follows:

$$E(z) = (e^{i\phi \cdot z} \pm e^{-i\phi \cdot z})(e^{i\Delta\phi \cdot z}) \tag{A}$$

wherein
$\phi = 2\cdot\pi/\Lambda_O$
$\Delta\phi = 2\cdot\pi/\Lambda_2$
$\Lambda_2$: a period of envelope (refer to FIG. 3 (A))

The second term $(e^{i\Delta\phi \cdot z} \pm e^{-i\Delta\phi \cdot z})$ of the equation A represents an envelope of the distribution $E(z)$; the wave form of which is a psuedo sine-wave.

The coupling equations of an optical wave-length filter in this case can be described as follows:

$$\frac{da}{dz} = i \cdot K(z) \cdot e^{i\Delta\beta \cdot z} \cdot b \tag{B}$$

$$\frac{db}{dz} = i \cdot K^*(z) \cdot e^{-i\Delta\beta \cdot z} \cdot a \tag{C}$$

wherein:

$$\Delta\beta = \frac{2\cdot\pi\cdot z}{\lambda} \cdot \Delta n$$

a: an amplitude in TM mode
b: an amplitude in TE mode
$K(z)$: a coupling coefficient between the TM mode and the TE mode
$K^*(z)$: a conjugate complex of $K(z)$
$\lambda$: wave length of light
$\Delta n$: a difference of refractive index between TM mode and TE mode.

Now, $K(z)$ is described as follows:

$$\begin{aligned} K(z) &= K_O \cdot E(z) \\ &= K_O \cdot (e^{i(\phi+\Delta\phi)\cdot z} \pm e^{-i(\phi+\Delta\phi)\cdot z} + \\ &\quad (e^{i(\phi+\Delta\phi)\cdot z} \pm e^{-i(\phi-\Delta\phi)\cdot z}) \end{aligned} \tag{D}$$

wherein $$K_O \propto \frac{\Gamma\cdot\pi}{\lambda} \cdot n_O{}^3 \cdot \gamma_{51} \cdot \frac{V}{G}$$

$\theta$: effective coefficient
$n_O$: refractive index of normal light
$\gamma_{51}$: electro-optical coefficient of the substrate
V: voltage applied to the finger-type electrode for control
G: electrode gap It is well known that at the wave length $\lambda$ where the exponential term (phase term) of $K(z)\cdot e^{i\Delta\beta\cdot z}$ according to the equation (B) becomes zero notwithstanding the value of $z$, the coupling between TM and TE modes becomes effective to cause an inter-related mode coupling.

When $\Delta\beta > 0$, the condition under which the phase term becomes zero notwithstanding the value of $z$ is:
$\Delta\beta = \phi + \Delta\phi$ or $\Delta\beta = \phi - \Delta\phi$.

The optical wave-length satisfying the equation $\Delta\beta = \phi \pm \Delta\phi$ is described as follows:

$$\frac{\Delta n}{\lambda} = \frac{1}{\Lambda_O} \pm \frac{1}{\Lambda_2} \tag{E}$$

The light having the wave-length $\lambda$ complying with the equation (E) is mode-converted and transmitted through the optical wave-length filter.

$\Delta n$ and $\Lambda_O$ are predetermined structural design parameters and the optical wave-length $\lambda$ transmitting through the optical wave-length filter can be varied by varying the period $\Lambda_2$ of the voltage.

As readily understood in the equation (E), there are two kinds of the optical wave-length $\lambda$ transmitting through the optical wave-length filter.

The wave length $\lambda$ can be written as $\lambda = \lambda_0 + \Delta\lambda_T$, wherein $\lambda_0$ is a standard design wave length, and $\Delta\lambda_T$ is a deviation amount of the standard design wave length $\lambda_0$. Assuming $\Delta\lambda_T << \lambda_0$ ($\Lambda_O << \Lambda_2$) for the benefit to narrow the range of the optical wave length $\lambda$ (band width of transmitted wave length) transmitting through the optical wave-length filter, the following equation (F) is achieved from the equation (E):

$$\frac{\Delta n}{\lambda_0} \cdot \left(1 - \frac{\Delta\lambda_T}{\lambda_0}\right) = \frac{1}{\Lambda_O} \pm \frac{1}{\Lambda_2} \tag{F}$$

The following equation (G) is achieved by modification of the equation (F):

$$\frac{\Delta\lambda_T}{\lambda_0} = \pm \frac{\lambda_0}{\Lambda_2} \tag{G}$$

The equation (G) clearly teaches that the optical wave-length filter can be transmitted by the light having the two wave lengths $\lambda_0 + \Delta\lambda_T$ and $\lambda_0 - \Delta\lambda_T$ aparting each other by $\pm\Delta\lambda_T$ from $\lambda_0$.

As readily understood from the analysis based upon the coupling equations as described above, when the smoothly varying distribution of electric field $E(z)$ is generated, an optical wave-length filter can be achieved which is transmitted therethrough by the light having two wave lengths $\lambda_0 + \Delta\lambda_T$ and $\lambda_0 - \Delta\lambda_T$.

By the way, when the distribution of electric field $e(z)$ varying step-wise is generated, the coupling coefficient $K(z)$ is described as follows:

$$K(z) = K_O \cdot (e^{i\phi \cdot z} e^{-i\phi \cdot z}) \cdot \int F(k) \cdot e^{i\cdot k \cdot z} dk \tag{H},$$

wherein $$F(k) = \left\{ e^{i\left(\frac{2\cdot\pi}{\Lambda_2} - k\right) \cdot \frac{L}{2}} \cdot \frac{\sin\left[N\cdot\left(\frac{2\cdot\pi}{\Lambda_2} - k\right)\cdot\frac{l}{2}\right]}{\sin\left[\left(\frac{2\cdot\pi}{\Lambda_2} - k\right)\cdot\frac{l}{2}\right]} + \right.$$

$$\left. e^{-i\left(\frac{2\cdot\pi}{\Lambda_2} + k\right)\cdot\frac{L}{2}} \cdot \frac{\sin\left[-N\cdot\left(\frac{2\cdot\pi}{\Lambda_2} + k\right)\cdot\frac{l}{2}\right]}{\sin\left[-\left(\frac{2\cdot\pi}{\Lambda_2} + k\right)\cdot\frac{l}{2}\right]} \right\}$$

-continued $$\frac{k}{2} \cdot \mathrm{Sin}\left(\frac{k \cdot l}{2}\right) \cdot \frac{2 \cdot \pi / \Lambda_2}{2 \cdot N \cdot \mathrm{Sin}\left(\frac{2 \cdot \pi}{\Lambda_2} \cdot \frac{l}{2}\right)}$$

$\tilde{F}(k)$ in the equation (H) has a peak value at the of k where either $$\mathrm{Sin}\left[\left(\frac{2 \cdot \pi}{\Lambda_2} - k\right) \cdot \frac{l}{2}\right] \text{or}$$

$$\mathrm{Sin}\left[-\frac{2 \cdot \pi}{\Lambda_2} + k\right) \cdot \frac{l}{2}\right]$$

becomes zero, that is, $$k = \pm \frac{2 \cdot \pi}{\Lambda_2} + \frac{2 \cdot j}{l} \cdot \pi = \pm \frac{2 \cdot \pi}{\Lambda_2} + \frac{2 \cdot \pi}{\Lambda_1} \cdot 2 \cdot j$$

(j=0, 1, 2, 3, ... ) and at the other value of k $\tilde{F}(k)=0$.

When j=0, there arises a main peak of the light having the conversion wave-length corresponding to the band region M described later in FIG. 8 and when J≠0, there arises a peak of the noise light corresponding to the band region N in FIG. 8.

Around the peak.

$$k \to \pm \frac{2 \cdot \pi}{\Lambda_2} + \frac{2 \cdot j}{l} \cdot \pi + \delta.$$

Accordingly, varying number of integral can be changed from dk to dδ.

Assuming that $f_j(z)$ is an integral by dδ at each of peak position, K(z) is approximately described as follows:

$$K(z) \simeq \tag{I}$$

$$K_0 \cdot (e^{i \cdot \phi \cdot z} + e^{-i \cdot \phi \cdot z}) \left[ f_0(z) \cdot \left( e^{i \cdot \frac{2 \cdot \pi}{\Lambda_2} \cdot z} + e^{-i \cdot \frac{2 \cdot \pi}{\Lambda_2} \cdot z} \right) + \sum_{\substack{j \neq 0 \\ j \neq 0}} \left( f_j(z) \cdot e^{i \cdot \frac{2 \cdot \pi}{\Lambda_2} \cdot z} + f_j(z) \cdot e^{-i \cdot \frac{2 \cdot \pi}{\Lambda_2} \cdot z} \right) \cdot e^{i \cdot \frac{2 \cdot \pi}{\Lambda_1} \cdot -2 \cdot j \cdot z} \right]$$

In the equation (I), the term $f_0(z)$ corresponds to the main peak of the light with a converted wave-length and equals to the equation (D).

The term $f_j(z)$ in case of j≠0 corrseponds to the peak of the noise light.

In connection with the step-wise varying distribution of electric field e(z), above mentioned equations (E), (F) and (G) can not only be achieved but also the following analysis (1)∼(3) obtain concerning the method invention.

(1) When $\Lambda_2=\Lambda_1$ that the repetition number of the period $\Lambda_2$ becomes maximum, the maximum value $\Delta\lambda_T$ (max) of the deviation value $\Delta\lambda_T$ can be obtained, wherein the maximum value $\Delta\lambda_T$ (max) can be described as:

$$\frac{\Delta\lambda_T(\max)}{\lambda_0} = \frac{\lambda_0}{\Lambda_1}$$

(2) When the phase term equals to zero, since it does not differ from the case where $\Lambda_2 = \infty$ (uniform mode-conversion, $\Delta\lambda_T=0$), the band width $\Delta\lambda_W$ in this embodiment where the optical wave-length filter transmits the light having two wave length $\lambda_0 \pm \Delta\lambda_T$ can be expressed as $$\frac{\Delta\lambda_W}{\lambda} = \frac{\lambda_0}{L}.$$

Accordingly, the band width $\Delta\lambda_W$ of the embodiment equals to that shown in FIG. 1, assuming both element length L being equal.

The operational voltage of the optical wave-length filter according to the embodiment is approximately 1.5 times larger than that of the optical wave-length filter shown in FIG. 1.

The channel number CH according to the embodiment is defined as $CH=\Delta\lambda_T(\max)/\Delta\lambda_W=L/\Lambda_1=$ periodic number N.

When the total number of the mode-converters 22 is represented as Nmax which are disposed between the polarizers 20 and 24, N can be described as N=Nmax/2.

When the band width $\Delta\lambda_W$ and the channel number CH are respectively equal to each other in the embodiment and in FIG. 1, the total length of the optical wave-length filter shown in FIG. 1 needs to be n-times larger than that of the embodiment.

(3) When the standard design wave-length $\lambda_0$ is set as $\lambda_0 = 1.3$ μm and a Ti-diffused wave-guide route is formed in a LinbO₃ substrate, the band width $\Delta\lambda_W$ is described as $\lambda_W \simeq 1.3$ nm due to $\Lambda_0 \simeq 18$ μm.

Accordingly, $\Lambda_1$ can be designed as $\Lambda_1 \simeq 180$ μm in order to achieve the channel number CH being CH=100, wherein the maximum deviation value $\Delta\lambda_T$ (max) is expressed as $\Delta\lambda_T(\max)=130$ nm.

Figure 5:
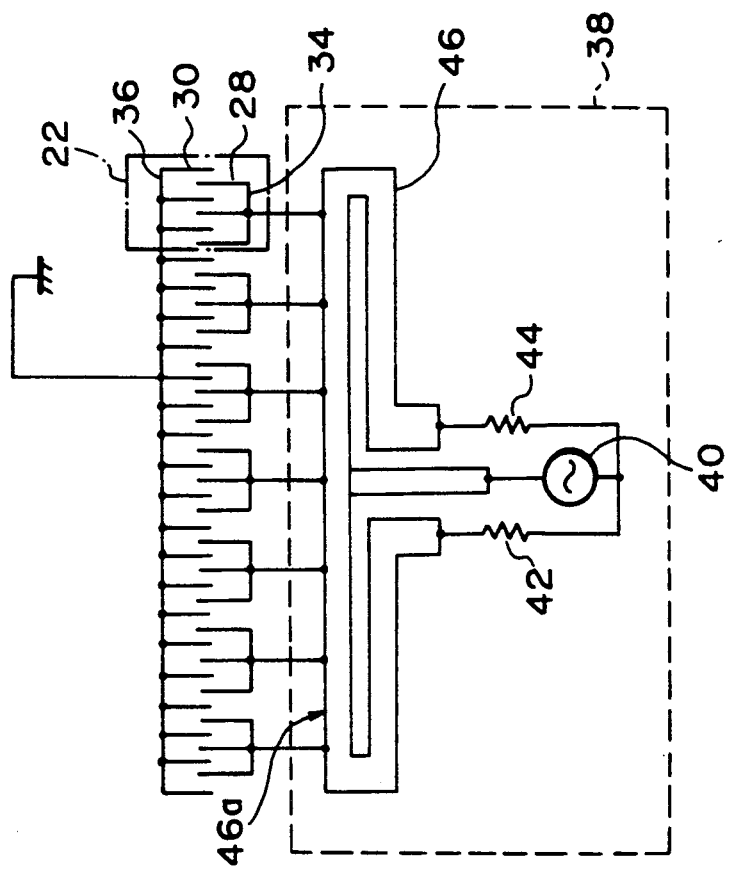
FIG. 5 is a constructive view illustrating one example of a voltage control device.
Figure 6:
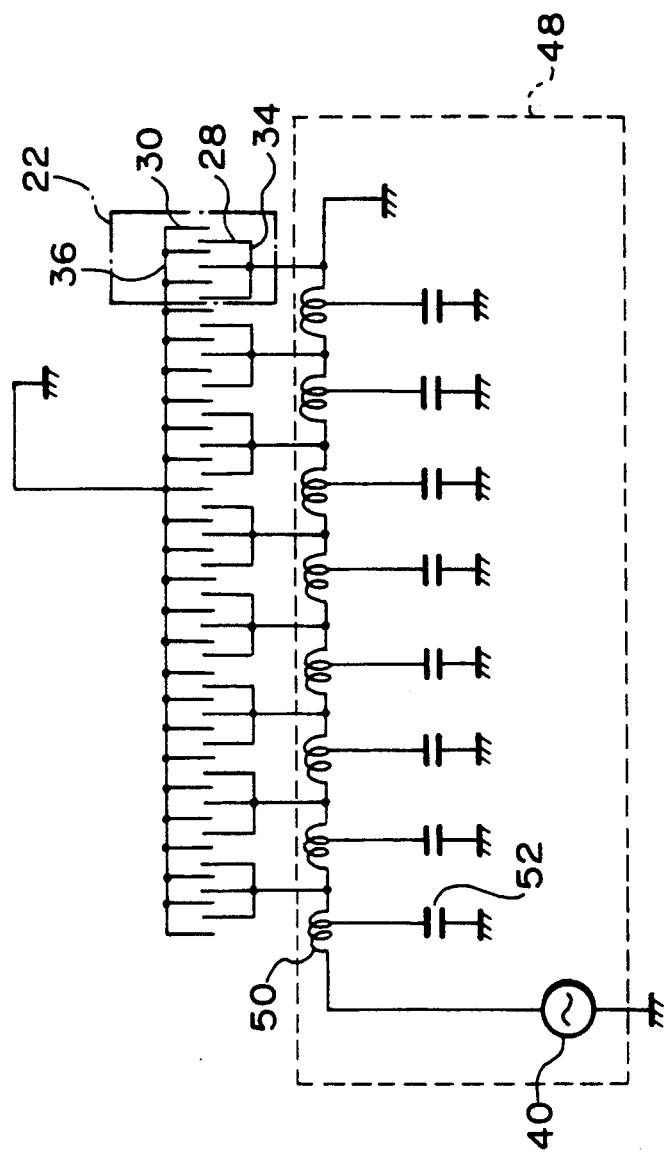
FIG. 6 is a constructive view illustrating another example of a voltage control device.

FIGS. 5 and 6 show constructive examples of a voltage control device to control the voltage Vm without utilizing a computer.

Above described control for the voltage Vm can be performed not only by controlling the voltage with a computer applied from the voltage source but by utilizing the voltage control devices shown in FIGS. 5 and 6.

The voltage control device 38 shown in FIG. 5 is constituted such that one terminal of a high frequency power source 40 is respectively connected through the resistor 42 and 44 to a left edge and a right edge of a micro wave resonator 46 and the other terminal of the high frequency power source 40 is connected to the center of the micro wave resonator 46.

The finger-type electrode 28 for control of the mode-converter 22 is connected through the common electrode 34 (FIGS. 2(A), 2(B)) to the output stage 46a of the micro wave resonator 46.

This device 38 can apply a psuedo sine-wave voltage to the finger-type electrode 28 by connecting the finger-type electrode 28 to the output stage 46a.

When the frequency of the high frequency power source 40 varies, the resonation wave form of the micro wave resonator 46 varies to cause the voltage supplied from the output stage 46a to the finger-type electrode 28 to be changed.

The micro wave resonator 46 illustrated above can be replaced by another conventional one.

The voltage control device 48 shown in FIG. 6 is constituted such that one terminal of the high frequency power source 40 is grounded and the other terminal of the high frequency power source 40 is also grounded through a plurality of the inductors 50 connected in series, and that each of the inductors 50 is grounded respectively through the capacitors 52. This device 38 can apply a psuedo sine-wave voltage to the finger-type electrode 28 by connecting the finger-type electrode 28 inbetween the adjacent inductors 50.

When the frequency of the higher frequency power source 40 varies, the resonation wave form of the resonation circuit which is constituted by the inductor 50 and the capacitor 52 varies to cause the voltage supplied to the finger-type electrode 28 being changed.

Figure 7:
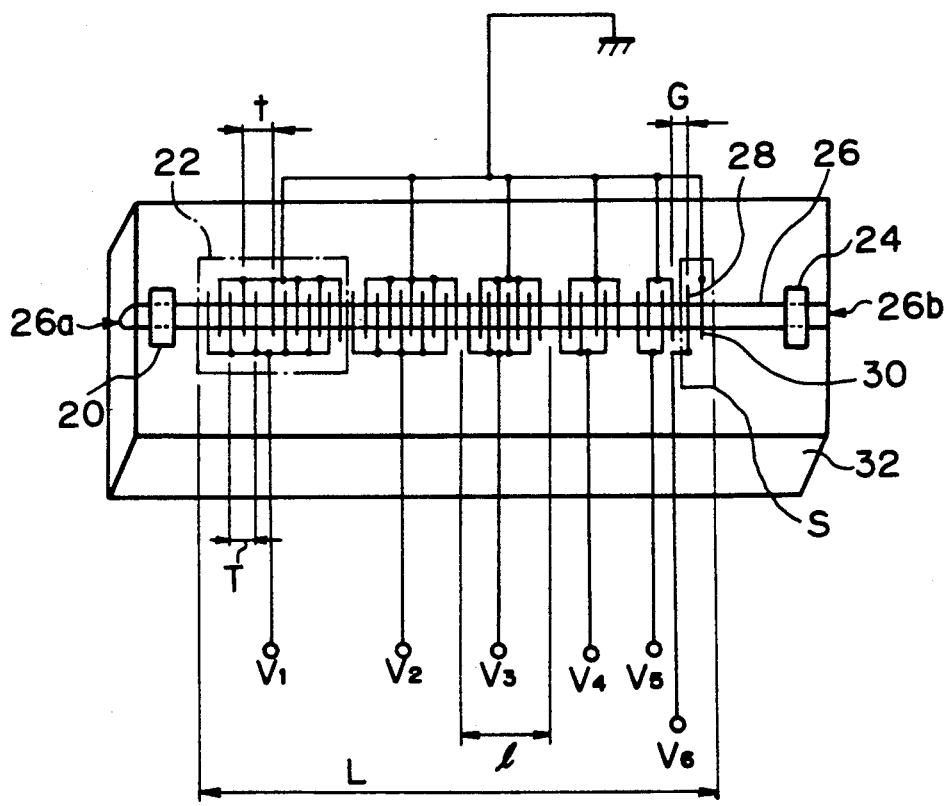
FIG. 7 is a perspective view schematically illustrating the second embodiment of the first invention.

FIG. 7 is a perspective view illustrating a schematical construction of the second embodiment of the invented structure, wherein identical elements corresponding to those of the first embodiment are shown with the same numerals.

Hereinafter, only the different aspects from the first embodiment of the first invention will be explained and the similar aspects will be omitted.

The second embodiment of the structure invention is constituted such that the length l of the mode-converter 22 becomes shorter (or longer) sequentially along a direction of arrangement. As shown in FIG. 7, progressing left to right, the length l decreases monotonically.

The total numbers of the finger-type electrodes 28 and 30 employed in the mode-converter 22 in one unit increase or decrease depending on increase or decrease of the length L.

The total number of the finger-type electrodes 28 and 30 employed in the mode-converter 22 in one unit can be single or plural.

One unit mode-converter 22 constituted by a single finger-type electrode 28 for control and a single finger-type electrode 30 for earthing is shown in FIG. 7 enclosed by the one-dotted line denoted by the letter S.

Figure 8:
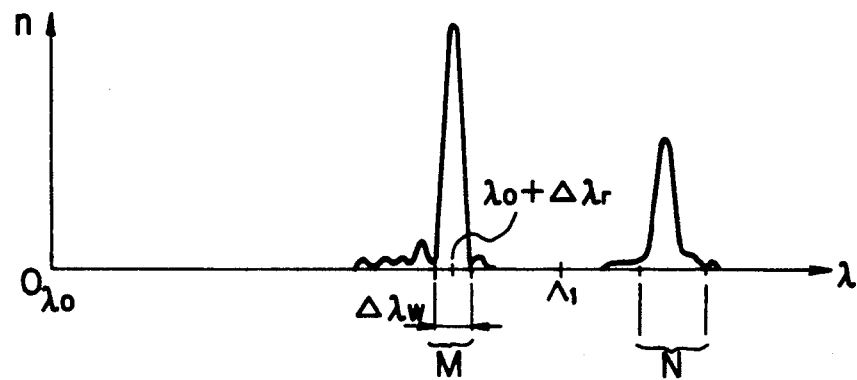
FIG. 8 is an explanatory view of noise light.

FIG. 8 is an explanatory view of noise light, wherein the vertical axis represents conversion efficency n of TM/TE mode conversion and the horizontal axis represents an optical wave length $\lambda$.

FIG. 8 shows the conversion efficency n converted each other between TM and TE modes corresponding to the optical wave length $\lambda$ in case that the optical wave-length filter of the first embodiment according to the first invention is driven by the embodiment according to the second invention and that the period $\Lambda_2$ is close to the period $\Lambda_1$ voltage.

As shown in the drawing, when an optical wavelength filter is driven, the mode-conversion of the light having a conversion wave length (or an approximate conversion wave length falling into the band width M having the band width $\Delta\lambda_W$ from the central conversion wave length) occurs and, in addition to that, the conversion efficency n of the noise light (the light falling into the image wave length band width N) is elevated to exceed $-10$ dB at the peak value when the period $\Lambda_2$ approaches to the period $\Lambda_1$.

However, since the length l of the mode-converter 22 of the FIG. 7 embodiment progressively becomes shorter or longer sequentially in accordance with its relative location along the waveguide route 26, the conversion efficiency of the noise light can be reduced, whereby the peak value of the conversion efficiency of the noise light can be reduced to below $-10$ dB even though the period $\Lambda_2$ approaches the period $\Lambda_1$.

Figure 9A:
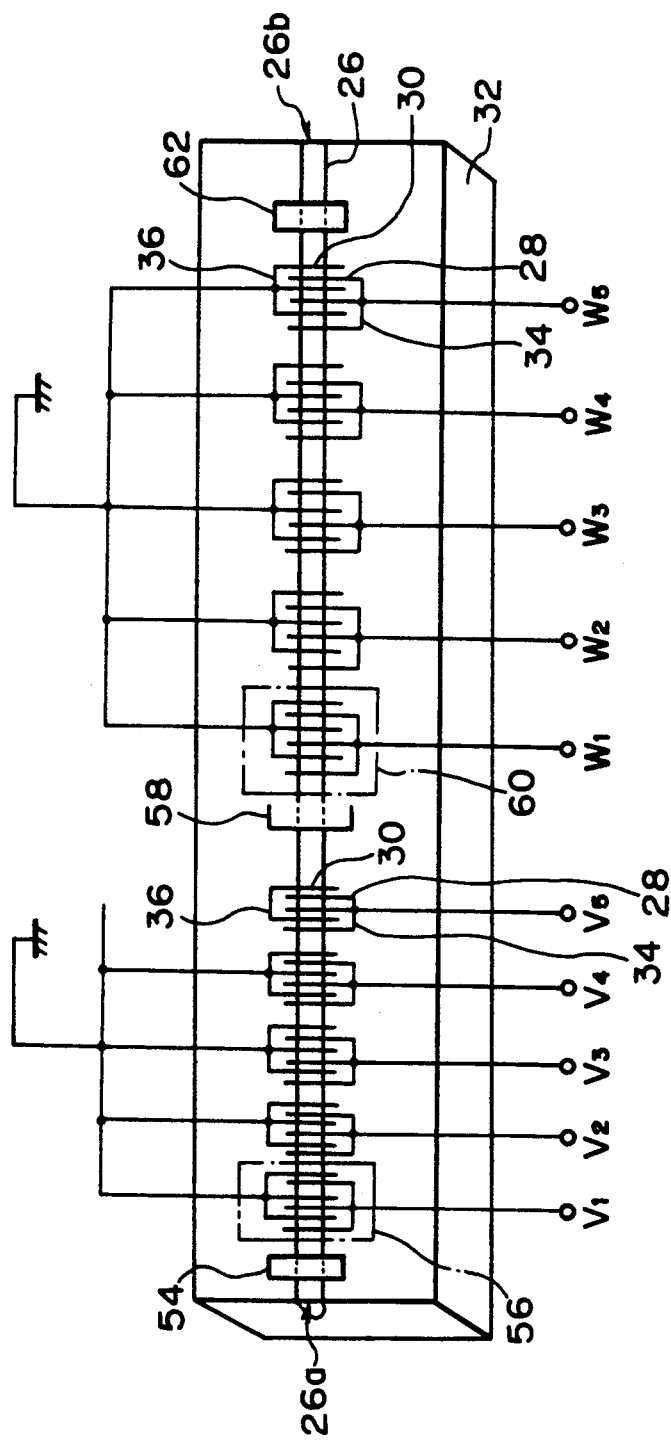
FIG. 9 (A)~(C) are explanatory views illustrating an embodiment of the third invention.
Figure 9B:
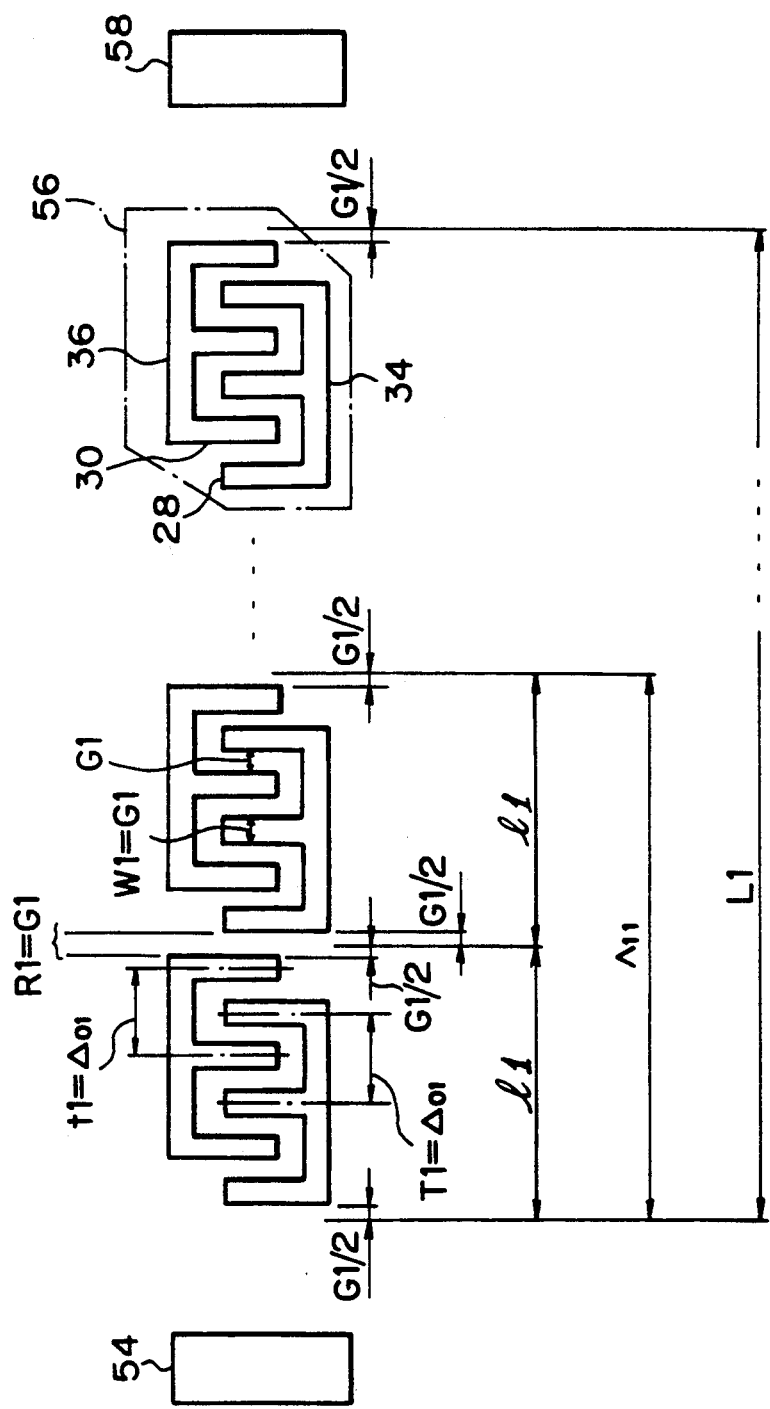
Figure 9C:
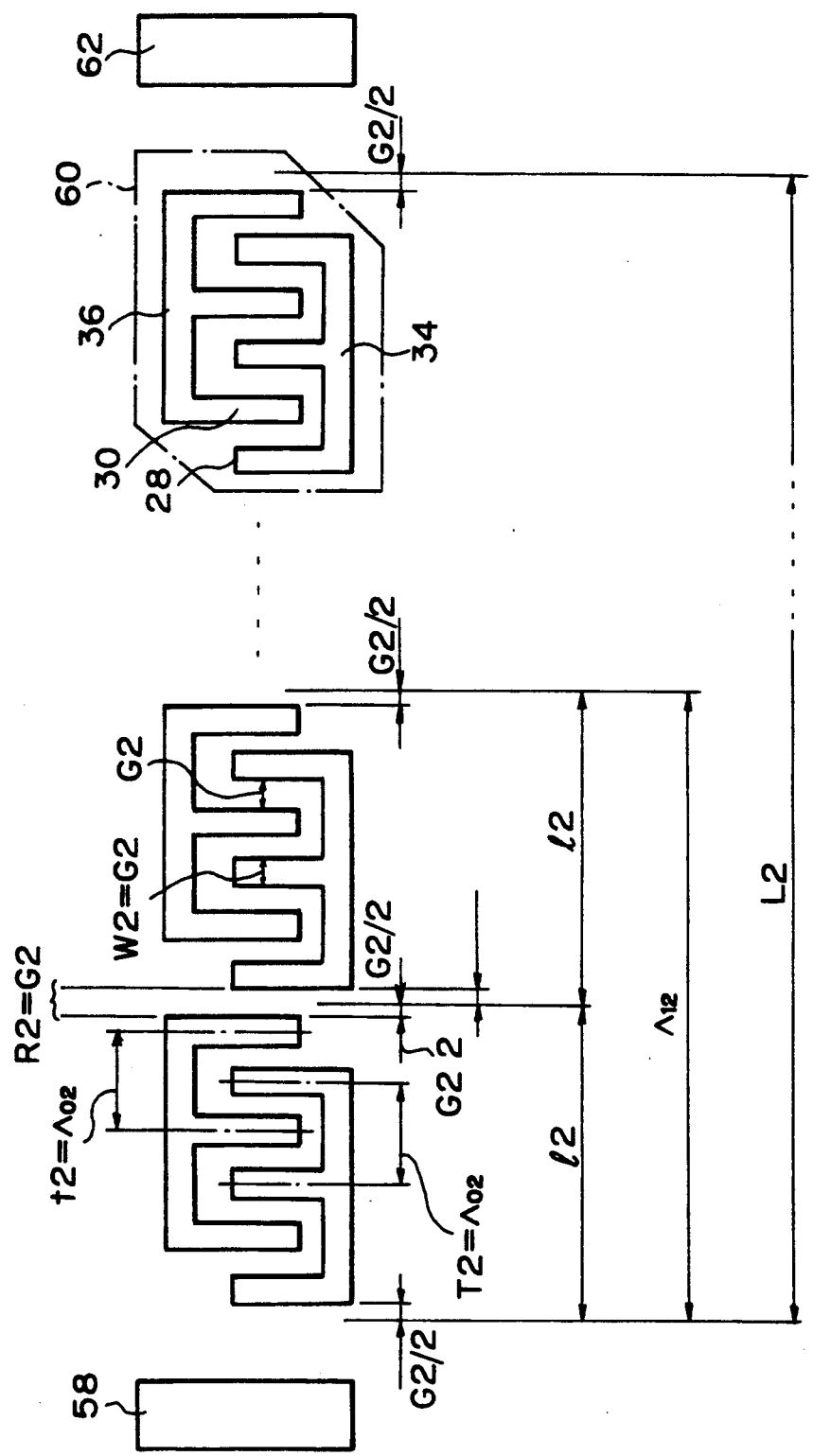

FIG. 9 (A)~(C) are explanatory views of the an embodiment according to a third invention. In this configuration, a plurality of first converters are disposed between a front polarizer and a middle polarizer, and a plurality of second converters are disposed between the middle polarizer and a rear polarizer. FIG. 9 (A) is a perspective view schematically illustrating the overall construction, FIG. 9 (B) is an enlarged plan view mainly illustrating the first mode-converter, arrangement and FIG. 9 (C) is an enlarged plan view mainly illustrating the second mode arrangement.

The identical elements corresponding to those of the above described embodiment are shown with the same numerals and the detailed explanation will be omitted.

An optical wave-length filter according to this embodiment employs, as shown in FIG. 9 (A), a front stage polarizer 54 for transmitting TM mode light as an input light of the optical wave-length filter, a plurality of the first mode converter 56 for mode-converting TM mode light having a conversion wave length corresponding to an output light of the optical wave-length filter into TM mode light selectively among TM mode light from the front stage polarizer 54, a middle stage polarizer 58 for transmitting the TE mode light from the first mode-converter 56, a plurality of the second mode-converter 60 for mode converting the TE mode light having the conversion wave length into the TM mode light selectively among the TM mode light from the middle stage polarizer 58, and a rear stage polarizer 62 for transmitting the TM mode light from the second mode converter 60 as an output light, all of which are disposed in the wave guide route 26.

The first and the second mode converters 56 and 60 are respectively constituted by combination of interdigitally disposed (interleaved) finger-type electrodes 28 for control and finger-type electrodes 30 for earthing.

There are disposed, in the embodiment, a front stage polarizer 54 located at the side of the input port 26a of the wave guide route 26, a rear stage polarizer 62 located at the side of the output port 26b, and a middle stage polarizer 58 between these polarizers 54 and 62. The polarizers 54, 58 and 62 are wave guide-type polarizers.

A first element group I is formed such that the first mode converters 56 are disposed between the front stage polarizer 54 and the middle stage polarizer 58.

A second group II is formed such that the second mode converters 60 are disposed between the middle stage polarizer 58 and the rear stage polarizer 62.

The filter portion I, which has the similar construction as the first embodiment according to the first invention, is constituted by the front stage polarizer 54, the middle stage polarizer 58 and a plurality of the first mode-converters 56 between both these polarizers.

The filter portion II, which has the similar construction as the first embodiment according to the first invention, is constituted by the middle stage polarizer 58, the rear stage polarizer 62 and a plurality of the second-mode converters 60 between these polarizers.

The filter portion I inputs the TM mode light from the input port 26a and converts the TM light having the conversion wave length into the TE mode light to be outputted.

The filter portion II converts the TE mode light having the conversion wave length selectively among the inputted TE mode light from the filter portion I into the TM mode light to be outputted from the output port 26b.

This embodiment, as shown in FIGS. 9 (B) and 9 (C), is constituted such that the period T1 of the finger-type electrodes 28 and the period t1 of the finger-type electrodes 30 employed in the first mode-converter 56 are respectively set to the common first period $\Lambda_{01}$ (T1=t1=$\Lambda_{01}$) with respect to all the first mode-converters 56. Likewise, the period T2 of the finger-type electrodes 28 and the period t2 of the finger-type electrodes 30 employed in the second mode-converter 60 are respectively set to the common second period $\Lambda_{02}$ (T2=t2=$\Lambda_{02}$) with respect to all the second mode-converters 60.

These periods $\Lambda_{01}$ and $\Lambda_{02}$ differ from each other ($\Lambda_{01} \neq \Lambda_{02}$).

The length $l_1$ of all the first mode-converters 56 is set to be equal to each other and the length $l_2$ of all the second mode-converters 60 is set to be equal to each other, wherein either $l_1 = l_2$ or $l_1 \neq l_2$ is possible.

Further, all the finger-type electrodes 28 and 30 disposed between the front and the middle stage polarizers 54 and 58 are disposed with a first interval G1 (the disposed interval or electrode gap), and all the finger-type electrodes 28 and 30 disposed between the middle and the rear stage polarizers 58 and 62 are disposed with a second interval G2 (the disposed interval or electrode gap).

The letter L1 and L2 appearing in FIGS. 9 (B) and 9 (C) represent a total length of the filter portions I and II, and $\Lambda_{11}$ and $\Lambda_{12}$ represent a period of disposed positions of the first mode-converter 56 and the second mode-converter 60 in which $\Lambda_{11} = 2 \cdot l_1$ and $\Lambda_{12} = 2 \cdot l_2$, and W1 and W2 represent an electrode width.

This embodiment is constituted such that the electrode width of the finger-type electrodes 28 and 30 in all the first mode-converters 56 is commonly set to the electrode width W1 and the electrode width of the finger-type electrodes 28 and 30 in all the second mode-converters 60 is commonly set to the electrode width W2.

The electrode gap G1 is preferably set to be equal to the electrode width W1 and the electrode gap G2 equal to the electrode width W2 in the same way.

The driving method according to a fourth invention applied to the FIG. 9 invention will now be explained.

The embodiment of the fourth invention is a driving method for driving the FIG. 9 embodiment of the third invention, wherein the voltage applied to each of the finger-type electrodes 28 is controlled in a manner such that the first distribution of electric field e1(z) along the wave-guide route 26 generated by the finger-type electrodes 28 and 30 of the first mode-converter 56 and the second distribution of electric field e2(z) along the wave-guide route 26 generated by the finger-type electrodes 28 and 30 of the second mode-converter 60 respectively have a psuedo sine-wave form accompanying a beat.

In addition to that, each of the distribution of electric field e(1) and e2(z) is respectively preserved to a fixed distribution form corresponding to the conversion wave length when mode-conversion is proceeded with one conversion wave length.

The distribution of electric field e1(z) is utilized for converting the TM mode light into the TE mode light in the filter portion I and the distribution of electric field e2(z) is utilized for converting the TE mode light into the TM mode light in the filter portion II.

Further, in the embodiment the first voltage Vn applied to the finger-type electrodes 28 of each first mode converter 56 is controlled in order to mode-convert the TM mode light such that the first voltage Vn preserves a psuedo sine-wave form distribution which corresponds to a disposed arrangement of the finger-type electrodes 28.

In addition to that, the second voltage Wn applied to the finger-type electrodes 28 of each second mode converters 60 is controlled in order to mode-convert the TE mode light such that the second voltage Wn preserves a psuedo sine-wave form distribution which corresponds to a disposed arrangement of the finger-type electrodes 28.

The distribution of electric field e1(z) and the first voltage Vn in the filter portion I and the distribution of electric field e2(z) and the second voltage Wn in the filter portion II are controlled in the same way as the embodiment according to the second invention.

The conversion wave length of the first mode-converter 56 in the filter portion I is given as $\lambda_{01} \pm \Delta\lambda_{T1}$ ($\lambda_{01}$ is preserved constant but variable.) where $\Delta\lambda_{T1}$ varies in response to the variation of the period $\Lambda_{22}$ of the second voltage Wn.

Figure 10A:
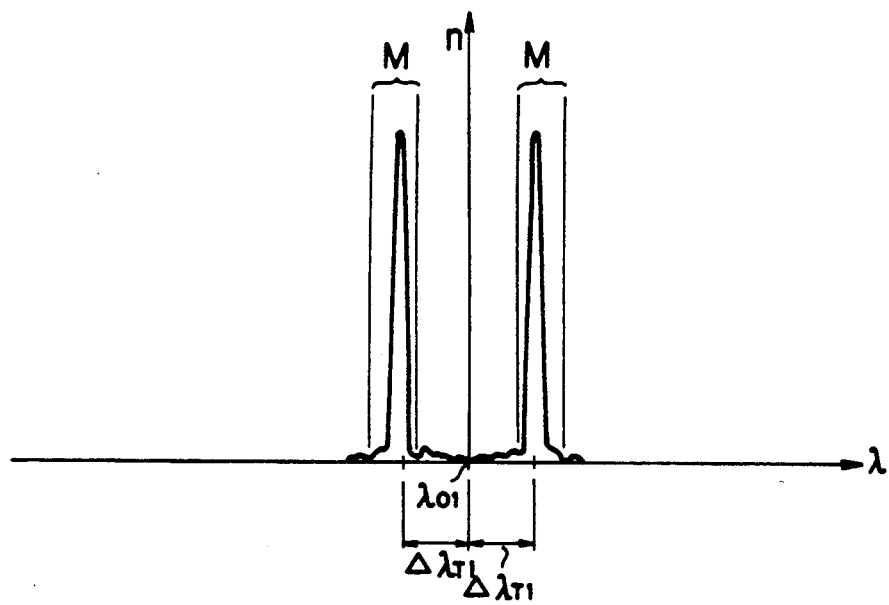
FIG. 10 (A), (B) are explanatory views illustrating an embodiment of the fourth invention.
Figure 10B:
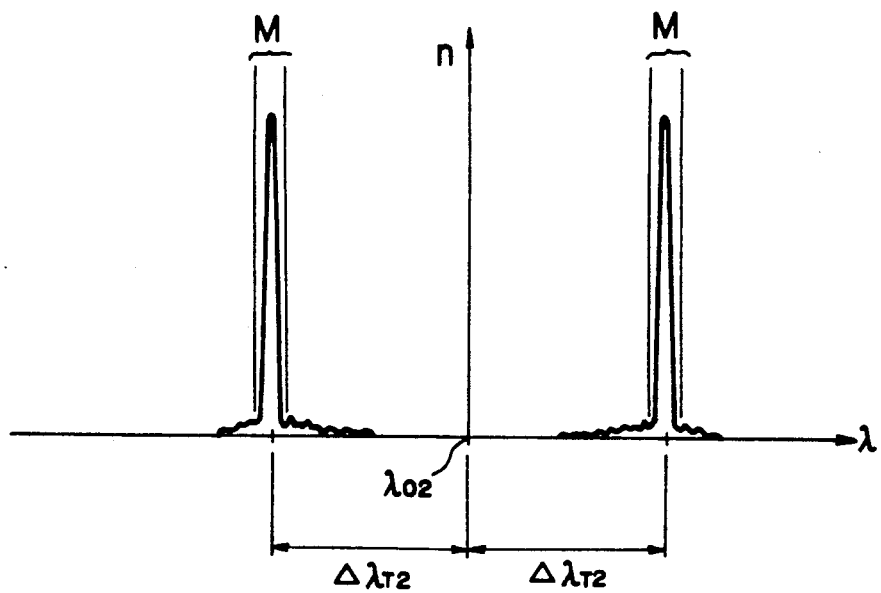

FIG. 10 (A), (B) is an explanatory view of the embodiment according to the fourth invention, wherein FIG. 10 (A) is illustrated such that the horizontal axis represents an optical wave length $\lambda$ mode-converted in the filter portion I and the vertical axis represents a conversion efficiency n, and FIG. 10 (B) is illustrated such that the horizontal axis represents an optical wave length $\lambda$ mode-converted in the filter portion II and the vertical axis represents a conversion efficiency n.

When the first period $\Lambda_{01}$ equals to the second period $\Lambda_{02}$, that is, $\lambda_{01} = \lambda_{02}$, the optical wave length selected by the optical wave-length filter becomes $\lambda_0 \pm \Delta\lambda_{T1}$ ($=\lambda_0 \pm \Delta\lambda_{T2}$) notwithstanding the control of $\Delta\lambda T_1$ and $\Delta\lambda_{T2}$.

However, when the first period $\Lambda_{01}$ differs from the second period $\Lambda_{02}$, that is, $\lambda_{01} \neq \lambda_{02}$, the optical wave length varies by controlling $\Delta\lambda_{T1}$ and $\Delta\lambda_{T2}$, as readily understood from FIG. 10.

When $\lambda_{01} + \Delta\lambda_{T1} = \lambda_{02} + \Delta\lambda_{T2}$, then $\lambda_{01} - \Delta\lambda_{T1} \neq \lambda_{02} - \Delta\lambda_{T2}$, or when $\lambda_{01} - \Delta\lambda_{T1} = \lambda_{02} - \Delta\lambda_{T2}$, then $\lambda_{01} + \Delta\lambda_{T1} \neq \lambda_0 + \Delta\lambda_{T2}$.

When $\lambda_{01} + \Delta\lambda_{T1} = \lambda_{02} + \Delta\lambda_{T2}$, Then $\lambda_{01} - \Delta\lambda_{T2} \neq \lambda_{02} - \Delta\lambda_{T2}$ so that the optical wave length selected by the optical wave-length filter becomes one single wave length, that is, $\lambda_{01} + \Delta\lambda_{T1}$ ($=\lambda_{02} + \Delta\lambda_{T2}$).

When $\lambda_{01} - \Delta\lambda_{T1} = \lambda_{02} - \Delta\lambda_{T2}$, then $\lambda_{01} + \Delta\lambda_{T1} \neq \lambda_0 + \Delta\lambda_{T2}$ so that the optical wave length selected by the optical wave-length filter becomes one single wave length, that is, $\lambda_{01} - \Delta\lambda_{T1}$ ($\times \lambda_{02} - \Delta\lambda_{T2}$).

According to the embodiment, the channel number of the optical wave-length filter of the third invention is doubled in comparison with that of the first invention.

This embodiment generates the first and the second distributions of electric field e1(z) and e2(z) concurrently and adjusts both periods of the first and the second voltages Vn and Wn in such a manner that either of two conversion wave lengths of the first mode-converter 56 in the filter portion I coincides with either of two conversion wave lengths of the second mode-converter 60 in the filter portion II, whereby a light with a desired wave length can be selected among lights with a plural wave length.

When the voltage applied to the finger-type electrode for control is controlled in the embodiments according to the first through the fourth inventions in such a manner that the mode-conversion efficiency of the mode-converter at an edge of the filter is smaller than that at the center of the filter, the form of the transmitted wave-length band width M can be improved.

Figure 11A:
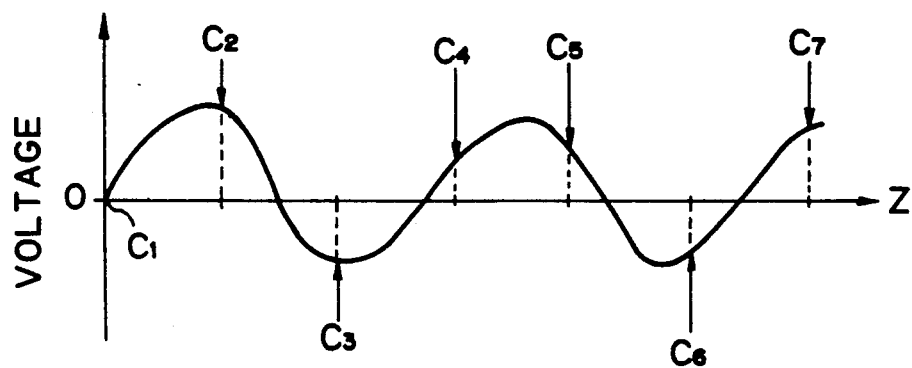
FIG. 11 (A), (B) are wave form charts illustrating a voltage distribution and a transmitted wave-length band width M corresponding to the distribution.
Figure 11B:
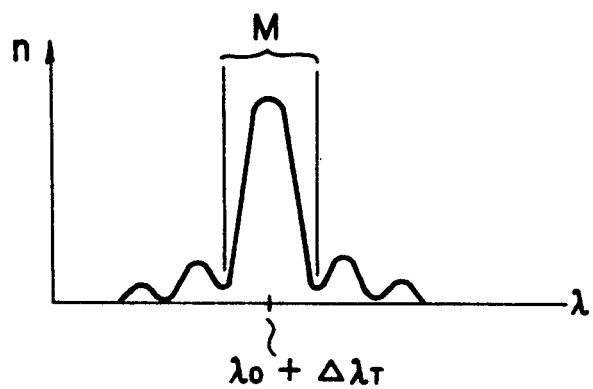

Referring to FIGS. 11 (A), (B) and 12 (A), (B), the detailed explanation will be made on the above point.

FIG. 11 (A) shows that the distribution of the voltage Vm of the embodiment according to the first invention has a psuedo sine-wave form corresponding to the position Cm, wherein the vertical axis represents the voltage Vm and the horizontal axis represents the distance z.

FIG. 11 (B) shows the transmitted wave-length band width M when the optical wave-length filter is driven by applying the psuedo sine-wave form voltage Vm as illustrated in FIG. 11 (A), wherein the horizontal axis represents an optical wave-length λ mode-converted by the optical wave-length filter and the vertical axis represents its conversion efficiency.

Figure 12A:
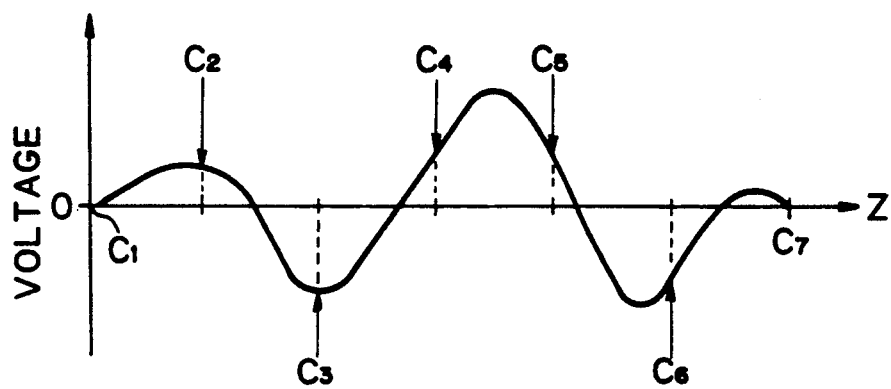
FIG. 12 (A), (B) are wave form charts illustrating a voltage distribution and a transmitted wave-length bandwidth M corresponding to the distribution.
Figure 12B:
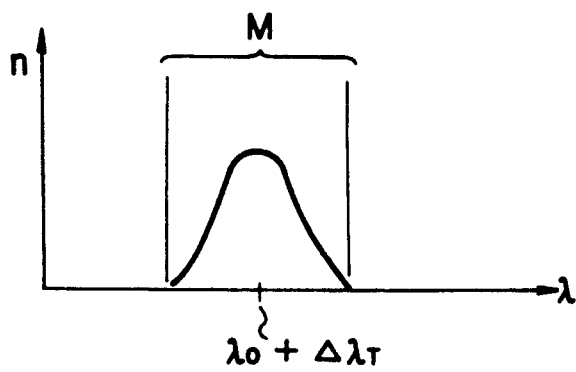

FIGS. 12 (A) and (B) are views similar to FIGS. 11 9A) and (B) showing the distribution of the voltage Vm and the transmitted wave-length band width M when the distribution of the voltage Vm is controlled in the embodiment according to the first invention in such a manner that the mode conversion efficiency of the mode-converter at an edge of the filter is smaller than that at the center of the filter.

As illustrated in FIG. 12 (A), when the voltage Vm is applied in such a manner that TM to TE mode-conversion efficiency of the mode-converters located at the edge portions C1, C2, C6 and C7 is smaller than that of the mode-converters located at the center portion C3, C4 and C5, the form of the transmitted wave-length band width M can be close to a practically desired rectangular form as readily understood from FIGS. 11 (B) and 12 (B).

The embodiments according to the first and the third inventions realize an optical wave-length filter the characteristics of which have the transmitted wave-length band width $\Delta\lambda_W$ being approximately 1 μm and the adjustable wave length range being more than 100 μm.

The present invention is not limited to the embodiments described above, and the form of each components, the disposed position, the positional relationship, the disposed number, the material, the manufacturing method and the other condition can be readily modified.

Since the separation distance R (refer to FIG. 2 (B)) between the ending electrode of the front stage mode-converter 22 and the starting electrode of the adjacent rear stage mode-converter 22 is set as R=G in the above mentioned embodiments, other modifications such as R being n-times (n: natural number) larger than G, can be readily achieved.

We claim:

1. An optical wave-length filter comprising:
a) a wave-guide route formed on a surface of a substrate;
b) a front stage polarizer disposed in the wave-guide route for transmitting as an input light either TM mode light or TE mode light;
c) a plurality of electro-optic mode-converters disposed in the wave-guide route configured for mode converting by means of an electric field applied to the wave guide route one TM/TE-mode light transmitted from the front stage polarizer having a conversion wave-length filter into the other TE/TM-mode light, the mode-converters comprising a finger-type electrode for control and a finger-type electrode disposed along the wave-guide route; and
d) a rear stage polarizer disposed in the wave-guide route for transmitting as the output light of the optical wave-length filter the other TE/TM-mode light.

2. The optical wave-length filter set forth in claim 1, wherein the finger type electrodes for control are regularly spaced with a first period and the finger type electrodes for earthing are also regularly spaced with a second period, wherein said first and second periods are common with respect to all the mode-converters.

3. The optical wave-length filter set forth in claim 2, wherein all the finger-type electrodes for control and earthing disposed between the front stage and the rear stage polarizers are disposed with an equal interval.

4. The optical wave-length filter set forth in claim 2, wherein each of the mode-converters has an equal length.

5. The optical wave-length filter set forth in claim 2, wherein each mode converter has a respective length and wherein said mode converter lengths progressively become shorter or longer along the waveguide route.

6. A driving method for driving an optical wave-length filter of the type having a waveguide route, a front stage polarizer, a rear stage polarizer, and a plurality of mode converters disposed along said route between said polarizers, each converter having a plurality of control finger-type electrodes and a plurality of earthing finger-type electrodes interleaved with said control electrodes, the method comprising the steps of:
applying a voltage to each of the control finger-type electrodes, and controlling the voltage to distribute an electric field along the waveguide route generated by the finger-type electrodes for control and the finger-type electrodes for earthing, the electric field having a pseudo sine-wave form accompanying a beat, and the distribution of electric field, the electric field being a fixed distribution corresponding to a conversion wave-length with which mode-conversion occurs.

7. The driving method for driving the optical wave-length filter set forth in claim 6, wherein a voltage applied to each of the finger-type electrodes for control is controlled such that a distribution of electric filed along the waveguide route has a pseudo sine-wave form relative to corresponding disposed positions of the electrodes.

8. An optical wave-length filter comprising:
a) a wave-guide route formed on a surface of a substrate;
b) a front-stage polarizer disposed in the wave-guide route for transmitting as an input light either TM mode light or TE mode light;
c) a plurality of first electro-optic mode-converters disposed in the wave-guide route configured for mode converting by means of an electric field applied to the wave guide route one TM/TE-mode light transmitted from the front stage polarizer having a conversion wave length corresponding to an output light of the optical wave-length filter into the other TE/TM-mode light;
d) a middle stage polarizer disposed in the wave-guide route for transmitting the other TE/TM-mode light from the first mode-converters;
e) a plurality of second electro-optic mode-converters disposed in the wave-guide route configured for mode converting by means of an electric field applied to the wave guide route the other TE/TM-mode light transmitted from the middle stage polarizer having the conversion wave length corresponding to the output light of the optical wave-length filter into one TM/TE-mode light; the first and the second mode-converters being constituted by a finger-type electrode for control and a finger-type electrode for earthing interdigitally couple for each other and disposed along the wave-guide route; and f) a rear stage polarizer disposed in the wave-guide route for transmitting as the output light of the optical wave-length filter one TM/TE-mode light.

9. The optical wave-length filter set forth in claim 8, wherein both periods of the finger-type electrodes for control and earthing of the first mode-converters are common with respect to all the first mode-converters; both periods of the finger-type electrodes for control and earthing of the second mode-converters are common with respect to all the second mode-converters; and the first common period differs from the second common period.

10. The optical wave-length filter set forth in claim 9, wherein all the finger-type electrodes for control and earthing disposed between the front stage and the middle stage polarizers are disposed with an first equal interval; and all the finger-type electrodes for control and earthing disposed between the middle stage and the rear stage polarizers are disposed with a second equal interval.

11. A driving method for driving the optical wave-length according to claim 8, wherein a voltage applied to each of the finger-type electrodes for control is controlled such that a first distribution of electric field along the wave-guide route generated by the finger-type electrodes for control and the finger-type electrodes for earthing of the first mode-converters and a second distribution of electric field along the wave-guide route generated by the finger-type electrodes for control and the finger-type electrodes for earthing of the second mode-converters respectively have a pseudo sine-wave form accompanying a beat, and each of the distributions of electric field is preserved to be a fixed distribution corresponding to a conversion wave-length with which mode conversion is proceeded.

12. The driving method for driving an optical wave-length filter of the type having a waveguide route, a front stage polarizer, a middle stage polarizer, a rear stage polarizer, a plurality of first mode converters disposed along said route between said first and middle stage polarizers, a plurality of second mode converters disposed along said route between said middle and rear stage polarizers, each converter having a plurality of control finger-type electrodes and a plurality of earthing finger-type electrodes interleaved with said control electrodes, the method comprising the steps of:

applying a first voltage applied to each of the finger-type electrodes for control of the first mode-converters is controlled such that a first distribution of electric field along the wave-guide route has a pseudo sine-wave form relative to corresponding disposed positions of the electrodes, and a second voltage applied to each of the finger-type electrodes for control of the second mode-converters is controlled such that a second distribution of electric field along the wave-guide route has a pseudo sine-wave form relative to corresponding disposed positions of the electrodes.

* * * * *